(12) United States Patent
Zhu et al.

(10) Patent No.: US 8,966,086 B2
(45) Date of Patent: Feb. 24, 2015

(54) LICENSE REDISTRIBUTING METHOD, MODERATOR AND LICENSE CONTROLLING SYSTEM THEREOF

(75) Inventors: Zhongwen Zhu, Saint-Laurent (CA); Hongxia Lawrence Long, Kunshan (CN); Li Ally Lv, Shanghai (CN); Cheng Charles Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 13/496,923

(22) PCT Filed: Nov. 23, 2009

(86) PCT No.: PCT/CN2009/001304
§ 371 (c)(1),
(2), (4) Date: Mar. 19, 2012

(87) PCT Pub. No.: WO2011/060567
PCT Pub. Date: May 26, 2011

(65) Prior Publication Data
US 2012/0185593 A1   Jul. 19, 2012

(51) Int. Cl.
*G06F 15/173* (2006.01)
*H04L 29/06* (2006.01)
*G06F 21/10* (2013.01)

(52) U.S. Cl.
CPC .......... *H04L 63/0807* (2013.01); *G06F 21/105* (2013.01); *H04L 63/10* (2013.01)
USPC ............................. 709/226; 709/224; 709/225

(58) Field of Classification Search
USPC .......... 709/201–203, 223–232, 237; 713/500, 713/502, 600, 601; 370/203, 229–232, 235, 370/464, 465, 477
See application file for complete search history.

(56) References Cited

U.S. PATENT DOCUMENTS

| | | | | |
|---|---|---|---|---|
| 5,138,712 A | * | 8/1992 | Corbin | 726/30 |
| 5,752,041 A | * | 5/1998 | Fosdick | 717/178 |
| 6,615,166 B1 | * | 9/2003 | Guheen et al. | 703/27 |
| 6,983,479 B1 | * | 1/2006 | Salas et al. | 725/23 |

(Continued)

FOREIGN PATENT DOCUMENTS

| | | |
|---|---|---|
| CN | 1996332 | 7/2007 |
| CN | 101060471 | 10/2007 |

(Continued)

OTHER PUBLICATIONS

International Search Report for PCT/CN2009/001304, mailed Sep. 2, 2010.

*Primary Examiner* — Hassan Kizou
*Assistant Examiner* — Phyllis Book
(74) *Attorney, Agent, or Firm* — Nixon & Vanderhye, P.C.

(57) ABSTRACT

The present invention provides a method for redistributing the license tokens to the traffic nodes to make the license tokens can be efficiently distributed to the traffic node. The method including: collecting usage information of each of the traffic nodes; determining a set of license tokens for each of the traffic nodes; and commanding a first group of traffic node(s) to release license tokens and commanding a second group of traffic node(s) to request license tokens based on the usage information and the set of license tokens. A moderator, used in a license controlling system which can efficiently redistribute the license tokens among the traffic nodes, is provided and a controlling system which including this moderator is also provided.

30 Claims, 10 Drawing Sheets

(56) References Cited

U.S. PATENT DOCUMENTS

| | | | |
|---|---|---|---|
| 7,134,144 B2* | 11/2006 | McKune | 726/26 |
| 7,249,176 B1* | 7/2007 | Salas et al. | 709/225 |
| 7,366,787 B2* | 4/2008 | Salas et al. | 709/229 |
| 7,760,641 B2* | 7/2010 | Gilfix | 370/235 |
| 7,813,276 B2* | 10/2010 | Gilfix | 370/230 |
| 7,979,864 B2* | 7/2011 | Meguro | 718/104 |
| 8,332,478 B2* | 12/2012 | Levy et al. | 709/217 |
| 8,370,416 B2* | 2/2013 | Hoover et al. | 709/201 |
| 8,438,298 B2* | 5/2013 | Arai et al. | 709/231 |
| 2004/0205194 A1* | 10/2004 | Sahai | 709/228 |
| 2005/0182731 A1* | 8/2005 | Marjadi et al. | 705/59 |
| 2005/0226201 A1* | 10/2005 | McMillin | 370/348 |
| 2008/0008094 A1* | 1/2008 | Gilfix | 370/235 |
| 2008/0082450 A1* | 4/2008 | Grimm et al. | 705/59 |
| 2008/0244754 A1* | 10/2008 | Curren | 726/27 |
| 2009/0055835 A1* | 2/2009 | Zhu | 718/105 |

FOREIGN PATENT DOCUMENTS

| | | |
|---|---|---|
| CN | 101155093 | 4/2008 |
| CN | 101478491 | 7/2009 |

* cited by examiner

LICENSE REDISTRIBUTING METHOD, MODERATOR AND LICENSE CONTROLLING SYSTEM THEREOF

This application is the U.S. national phase of International Application No. PCT/CN2009/001304 filed 23 Nov. 2009 which designated the U.S., the entire contents of which is hereby incorporated by reference.

TECHNICAL FIELD

The present invention relates, at least in part to the field of license management. In particular, the present invention relates to license redistributing in a license management system.

BACKGROUND

License management is used for controlling the use of software applications. A software application is designed with a built-in function that allows it to operate only when an appropriate license is available.

In comparison with the on-off feature-based license management, the usage-based license management is becoming more and more popular. One type of the usage-based license management is capacity-based controlling system in which the number of transactions per a period is restricted.

A basic license controlling system based on the capacity typically includes one or more traffic nodes that handle the incoming traffic and provide telecom services for terminals in the telecom network, and license server that controls all traffic nodes to use the traffic legally, wherein each traffic node may provide at least one type of service, such as only Short Message Service (SMS), or SMS and email service. A large-scale license controlling system which comprises more license servers and traffic nodes is established for big customer, as shown in FIG. 1, therein wherein the network is divided into sub-networks either logically according to the traffic type or geographically according to the governing area, and the license servers are connected with each other. Typically, one license server in each sub-network serves the license requests from its own sub-network. However, other servers can take over that requests when the server failed in dealing with it.

Since the validation of service usage is performed against the number of allowed license tokens on each traffic node, wherein the license tokens are obtained from license server, it is actually impracticable to obtain the license tokens from the license server each time when there is a new incoming request to traffic node from terminal via the telecom network.

A widely used solution is shown in FIG. 2. In this solution, a number of license tokens are even distributed to each traffic node for example during the initializing. Refer to FIG. 2, numbers of license tokens 200, which are used to control the traffic capacity 210 of incoming requests for services provided by traffic nodes 20, are preserved at each of traffic nodes 20. Once the traffic capacity 210 of the incoming requests exceeds the preserved license tokens 200 at any traffic node, for example, the traffic node 203, the traffic node sends a request for renewing license tokens to a license server 22. In case of failing to renew license tokens, the exceeded service requests is blocked or queued up, while most of the preserved license tokens 200 at the traffic node 201 are left unused for less traffic capacity of incoming request. Borrowing unused license tokens from other traffic nodes are allowed in some case, but it is impracticable for the complex operation.

A post-validation mechanism, allowing the traffic of incoming requests to be passed before license validation and deducting the license tokens corresponding to the actual usage from the license server after a certain timeframe, is used in another solution. Comparing with so called pre-validation mechanism (every traffic of incoming request will be validated against the license tokens before further process of the traffic request) used in above mentioned solution, such post-validation mechanism avoids the problem that caused by even distribution of license tokens at the beginning in an unpredicted unbalanced traffic environment, as well the complexity of token borrowing between the traffic nodes.

However, after the initial distribution of the license tokens in pre-validation mechanism or deducting the license tokens in post-validation, both pre-validation and post-validation mechanism utilizes the "first come first served" approach (i.e. the requests from the traffic nodes are served in the order of their reaching the license sever) to make the traffic nodes obtain license tokens from the license server. Under this approach, once license tokens at the license server are used up, any request for tokens, no matter from which traffic node it come's, will be refused or queued up without considering priority, importance or demand of the request until the occupied license tokens are released and made available again. This manner may be suitable in a single-type service environment where only one type of service is provided by traffic nodes or each of traffic nodes plays equal important role in the network. But it is unacceptable in a mixed-service environment, where more than two types of service are provided by one or more traffic nodes or the traffic nodes obtain the license tokens from the same license server in a manner of "first come first use" even if they hold different priorities or weights, in a license controlling system.

The prior art way of distributing the license tokens in the "first come first served" approach may cause that the license controlling system, due to missing license in some nodes, can not handle the more prioritized requests while it at the same time handles less prioritized requests.

SUMMARY

In practice, certain traffic node should deserve a higher priority or importance for its service or location and so on. Accordingly, it would be desirable to provide a method and a system for providing an efficient redistribution mechanism in a license controlling system to overcome the above mentioned disadvantages.

Therefore, it is one object of the present invention to address the above disadvantages by providing a method, a moderator and a license controlling system for efficiently redistributing the license tokens among the traffic nodes.

According to one aspect of the invention, a method of redistributing the license tokens to the traffic nodes is provided, and the method comprise the steps of: collecting usage information of each of the traffic nodes; determining a set of license tokens for each of the traffic nodes; and commanding a first group of traffic node(s) to release license tokens and commanding a second group of traffic node(s) to request license tokens based on the usage information and the set of license tokens.

Wherein the usage information includes a traffic capacity of each of the traffic node and the number of existing license tokens at each of the traffic node.

Wherein the set of license tokens for each traffic node is determined by calculating the total number of tokens in the set of license tokens based on the traffic capacity and the number of existing license tokens.

Preferably, the method further includes collecting the number of available license tokens at a server of the license controlling system before the determining step.

Wherein the set of license tokens for each traffic node is determined by calculating the total number of tokens in the set of the license tokens based on the traffic capacity, the number of existing license tokens and the collected number of available license tokens at the license server.

Wherein a redistribution algorithm is preconfigured, and the redistribution algorithm is priority based, demand based or weight based distribution algorithm.

Wherein the first group of traffic node(s) includes the traffic node where the number of the existing license tokens are more than the total number of tokens in the set of license tokens; the second group of traffic node(s) includes the traffic node where the number of the existing license tokens are less than the total number of tokens in the set of license tokens.

Preferably, the method further includes triggering the redistributing before collecting the usage information of each of the traffic nodes.

As one aspect, the redistributing is triggered by a request from any traffic node. In this case, the method further includes checking whether the redistribution requested is allowed before triggering the redistributing, by comparing the interval between the request and the last request with a predetermined period of time, if the interval is more than or equal to the predetermined period of time, the redistribution requested is allowed.

As another aspect, the redistributing is triggered by receiving triggering information from a settable timer. In this case, the method further includes setting the settable timer according to a timing algorithm.

According to one aspect of the invention, a moderator used in a license controlling system is provided, which includes: an input unit; an output unit; a processing unit which is adapted to collect usage information of each of the traffic nodes and determine a set of license tokens for each of the traffic nodes; and a memory portion for at least storing the usage information and the set of license tokens.

Wherein by the output unit, the processing unit further commands a first group of traffic node(s) to release license tokens and commands a second group of traffic node(s) to request license tokens according to the usage information and the set of license tokens.

Wherein the usage information collected by the processing unit includes the traffic capacity of each of the traffic nodes and the number of existing license tokens at each of the traffic nodes.

Wherein the processing unit determines the set of license tokens for each the traffic node by calculating the total number of tokens in the set of license tokens on the basis of traffic capacity and the number of existing license tokens.

Wherein the processing unit further collects the number of available license tokens at a server of the license controlling system by the input unit.

Wherein, by calculating the total number of tokens in the set of license tokens on the basis of the traffic capacity, the number of existing license tokens and the available license tokens, the processing unit determines the set of license tokens for each traffic node. Preferably, a redistributing algorithm, which can be used to calculate the total number of tokens in the set of license tokens, is preconfigured to the moderator, and the redistributing algorithm is priority based, demand based or weight based distribution algorithm.

Wherein the first group of traffic node(s) includes the traffic node where the number of existing license tokens are more than the total number of tokens in a set of the license tokens; the second group of traffic node(s) includes the traffic node where the number of existing license tokens are less than the total number of tokens in the set of license tokens.

Wherein, by the input unit, the processing unit receives a request for redistribution from any of the traffic node before it collects the usage information.

Wherein the process unit then checks if the request for redistribution is allowed by comparing the interval between said request and the last request with a predetermined period of time, if the interval is more than or equal to the predetermined period of time, the request for redistribution is allowed.

Wherein, the process unit further updates the last redistributing time. Preferably, the moderator includes a settable timer for setting the redistributing time.

Wherein, the process unit receives triggering information from the settable timer.

Wherein, the settable timer updates the redistribution time for next redistributing.

According to another aspect of the invention, a license controlling system is provided, which includes traffic nodes for handling incoming traffic from telecom network, and providing services to terminals requesting the services via the network; license server for sending license tokens to the traffic nodes and receiving the license tokens released by any of the traffic nodes; and a moderator above described.

According to a yet aspect of the invention, a server for a license controlling system, which is integrated with a moderator above described is provided.

Further, a license controlling system which includes plurality of traffic nodes and a server above described is also provided.

Further, a computer program, stored on a tangible storage medium, for redistributing license tokens to traffic nodes in a license controlling system is provided, and the program comprises executable instructions that cause a computer to collect usage information of each of the traffic nodes; determine a set of license tokens for each of the traffic nodes; and command a first group of traffic node(s) to release license tokens and commanding a second group of traffic node(s) to request license tokens based on the usage information and the set of license tokens.

A computer readable medium including logic for redistributing license tokens to traffic nodes in a license controlling system is also provided, wherein the logic is operable to collect usage information of each of the traffic nodes; determine a set of license tokens for each of the traffic nodes; and command a first group of traffic node(s) to release license tokens and commanding a second group of traffic node(s) to request license tokens based on the usage information and the set of license tokens.

BRIEF DESCRIPTION OF THE DRAWINGS

The above and other aspects, features, and advantages of the present invention will be more apparent from the following more particular description thereof, presented in conjunction with the accompanying drawings, in which.

DETAILED DESCRIPTION

Briefly described, the present invention, at least in part, provides a solution that the license tokens can be efficiently distributed after the initial distribution, based on the requirement of each traffic node.

The term "moderator" herein refers to a device which is used to determine a set of license tokens for each of traffic nodes and command the traffic nodes to release or request more license tokens after comparing the set of license tokens with the existing license tokens at each of traffic nodes.

Figure 1:
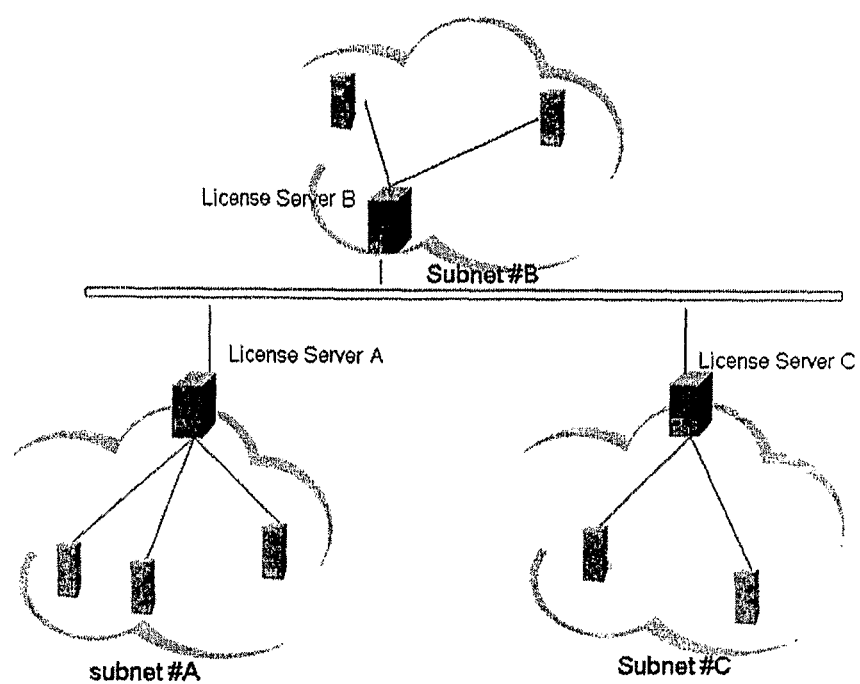
FIG. 1 is a schematic diagram illustrating a conventional license controlling system based on the capacity.
Figure 2:
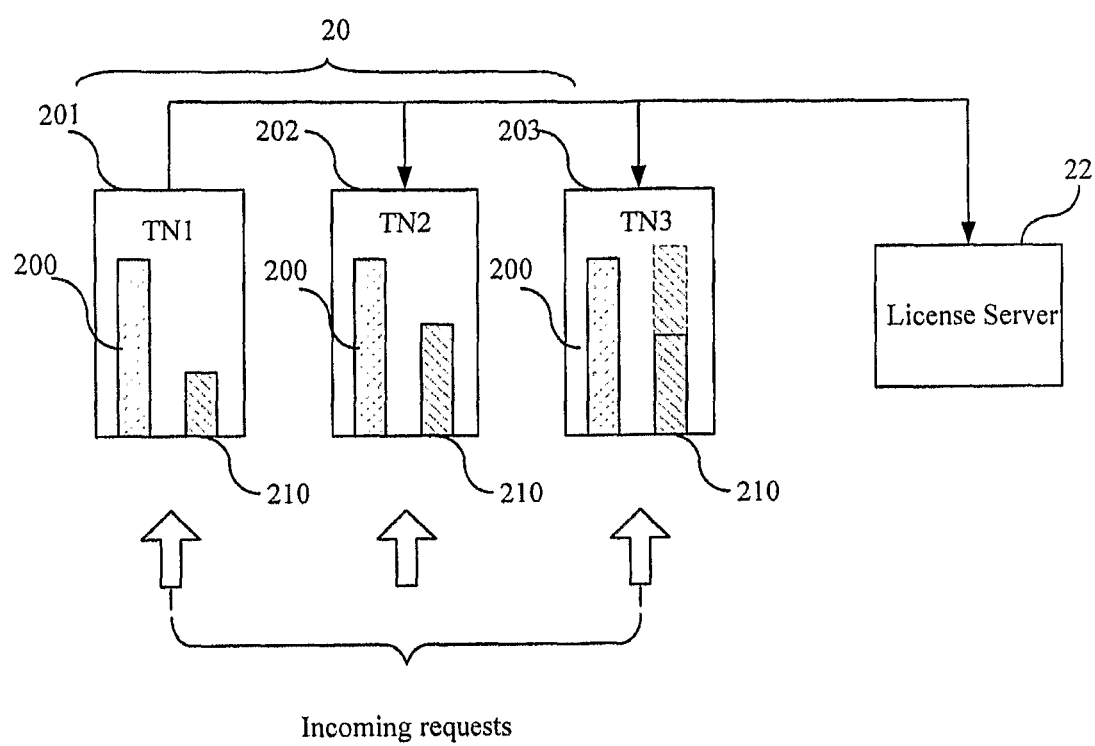
FIG. 2 is schematic diagram illustrating a widely used conventional license controlling system.
Figure 3:
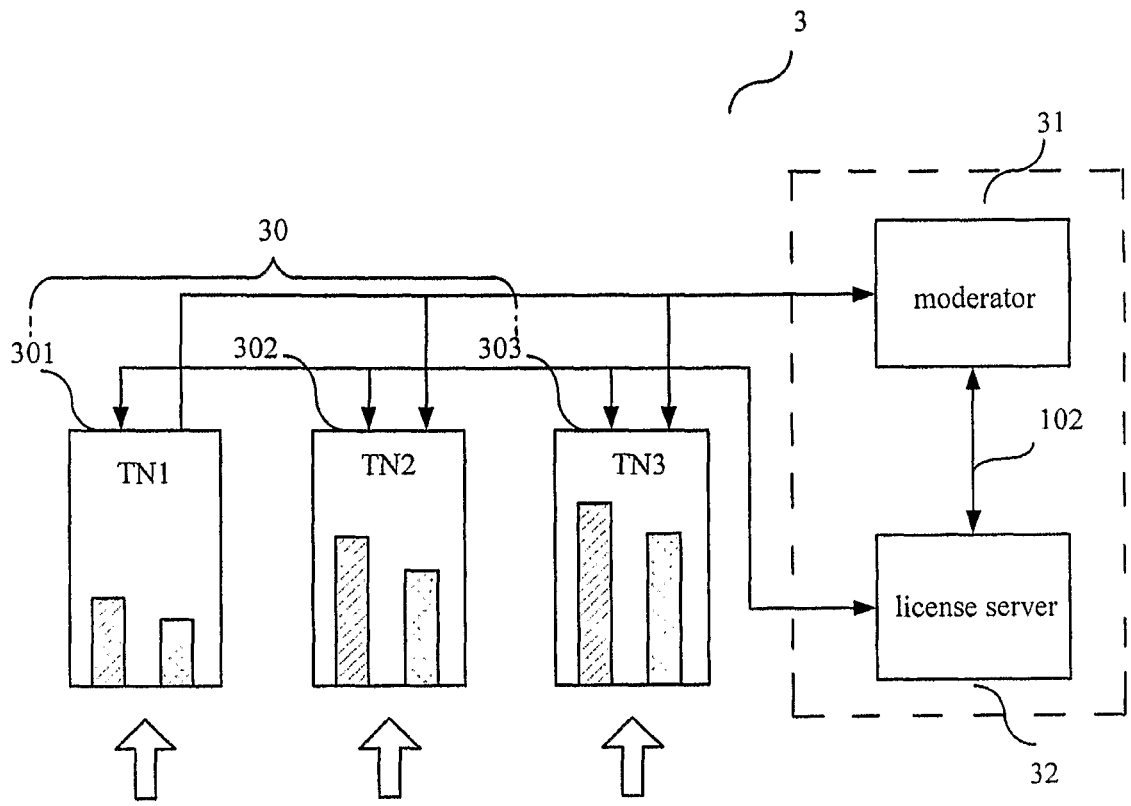
FIG. 3 is a block diagram showing the license controlling system according to one example of the present invention.

FIG. 3 is a block diagram showing the license controlling system according to one example of the present invention. License controlling system 3 includes a license server 32, a moderator 31, and plurality of traffic nodes 30. The license server 32 can be any computer-based server adapted to store the license tokens which may installed by the operator. Further, the license server 32 is adapted to send the license tokens to traffic nodes 30, and receive the license tokens released by the traffic nodes 30.

The traffic nodes 30 comprises plurality of traffic nodes TN1 301, TN2 302, and TN3 303 for handling the traffic of incoming requests and providing the telecom services, such as short massages, emails, file transfers and other network services, for terminals (not shown), such as mobile phone, fixed-phone, PDA, PCs and so on, or other network nodes like MSC, CSCF etc., via the telecommunication network. Each of the traffic nodes 30 can be computer-based server and adapted to request and receive the license tokens from the license server 32 and release the license tokens to the license server 32. In some case, the traffic node can also be referred as a traffic processing unit in the concept of one product with several loads sharing servers in the system. It can be understood that the traffic nodes 30 may comprise more traffic nodes than the number of traffic nodes shown in FIG. 3, or less than.

The moderator 31 is adapted to collect the usage information from each of the traffic nodes 30, wherein the usage information includes: the number ($T_i$) of existing license tokens at each of the traffic nodes 30 and/or the traffic capacity ($V_i$) of each traffic node. The moderator 31 may collect the number ($T_s$) of available license tokens from the license server 32. Further, the moderator 31 is adapted to calculate the suggesting number (Si) of license tokens for each of the traffic nodes 30 based on the total number ($\Sigma T_i + T_s$) of the license controlling system 3 and/or the traffic capacity ($V_i$) of each traffic node. (As used herein, the terms "a/the suggesting license tokens" represent "a/the set of license tokens", and the terms "a/the suggesting number of license tokens" represent "a/the total number of tokens in the set of license tokens".) The moderator 31 then commands the first group of traffic nodes, in each of which the suggesting number of license tokens is less than the number of its existing tokens, to release additional tokens ($R_i$, $R_i = T_i - S_i$) to the license server 32 and/or commands the second group of traffic nodes, in each of which the suggesting number of license tokens is more than the number of its existing tokens, to request more license tokens (Ri, Ri=Si—Ti) from the license server 32. In present description, the subscript i represents a serial number of the traffic node.

Figure 3A:
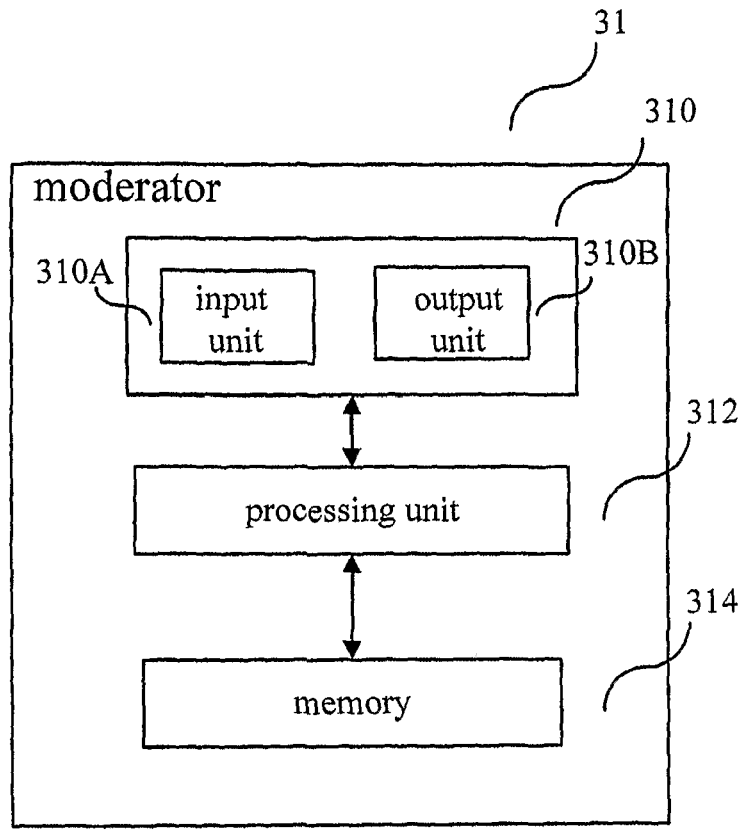
FIG. 3A is a block diagram showing the moderator 31 in more detail.

FIG. 3A is a block diagram showing the moderator 31 in more detail. Refer to FIG. 3A, the moderator 31 includes an input/output unit 310, which can include an input unit 310A and an output unit 310B, is configured to receive information from the traffic nodes 30 and/or the license server 32 by the input unit 310A and to send information to the traffic nodes 30 and/or the license server 32 by the output unit 310B, wherein the information at least includes the information relating to the existing number of license tokens $T_i$, the suggesting license tokens $S_i$, the additional license tokens $R_i (R_i = T_i - S_i)$, and more license tokens $R_i$ ($R_i = S_i - T_i$); a processing unit 312 for operating the redistributing of the license tokens; and a memory portion 314 for storing the information that can be accessed by the processing unit 312, such as the number of existing license tokens etc., wherein the memory portion 314 can be a cache, a buffer, or a RAM, alternatively, the memory portion 314 may be a memory separated from the moderator itself.

As illustrated with the solid box of FIG. 3, the moderator 31 is separated from the license server 32. And the dotted box illustrates another alternative architecture where the moderator 31 may be integrated with the license server 32.

It is noted that the moderator 31 directly communicates with the license server 32 by connection 102 in above controlling system 3, however, in practice, the controlling system 3 can run without the connection 102. In that case, the total number of license tokens in this controlling system 3 can be preconfigured to the moderator 31 for example by the operator, for example, said total number of license tokens is configured to the memory portion 314 of the moderator 31 when it is configured to the license server. So that the process unit 312 obtains the total number of the licenses tokens of the controlling system 3 by only accessing the memory portion 314 when calculating the suggesting number of the license tokens, rather than accessing the license server 32.

Figure 4:
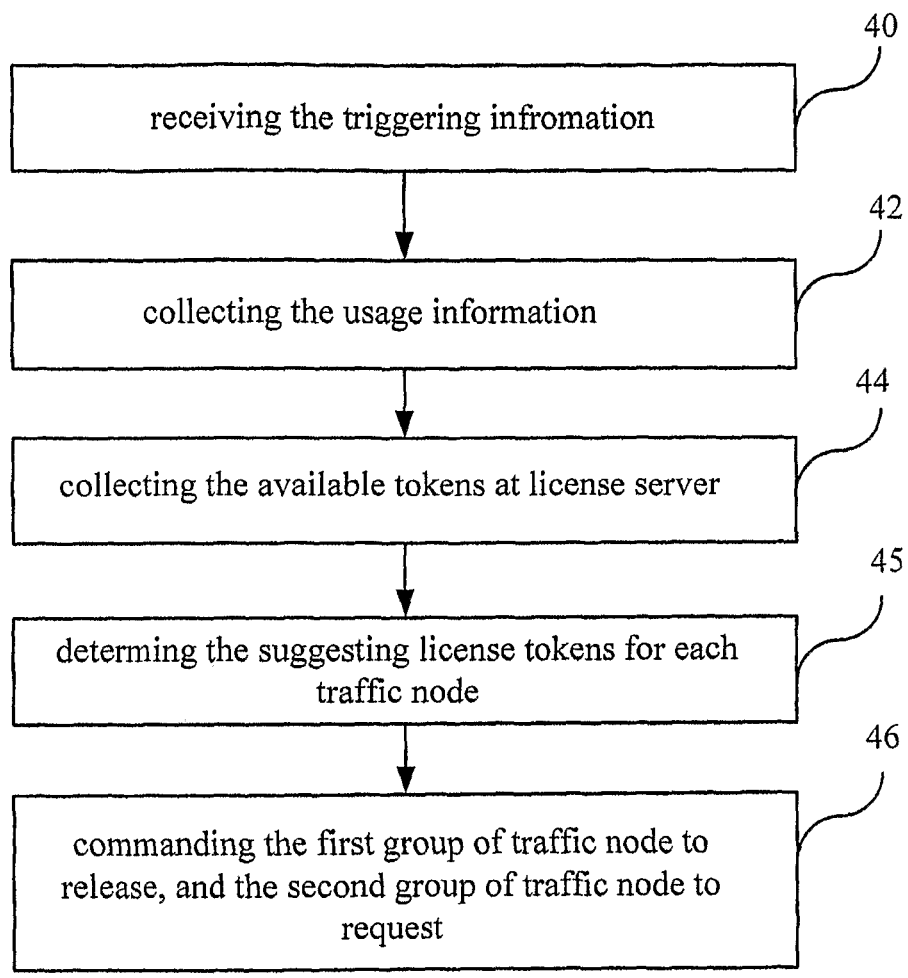
FIG. 4 is a step diagram of a redistributing procedure of one example according to the present invention.

FIG. 4 is a step diagram of a redistributing procedure of one example according to the present invention. In first step of 40, once the processing unit 312 of the moderator 31 receives triggering information by the input/output unit 310, the moderator 31 starts the redistribution. The triggering information can either come from outside of the license controlling system 3, e.g. by an operator, or inside, e.g. by a traffic node or by a timer (not shown in FIG. 3). In then step of 42, the processing unit 312 collects the usage information from each traffic node and receives said information by the input/out unit 310; moreover, the information may be stored in the memory portion 314 wherein the usage information includes: the number ($T_i$) of existing license tokens at each of the traffic nodes 30 and/or the traffic capacity ($V_i$) of each traffic node. And in step of 44, the processing unit 312 collects the number ($T_s$) of available tokens at the license server 32. In step of 45, the processing unit 312 further determines the suggesting license tokens for each of traffic nodes 30 by calculating the suggesting number ($S_i$) of license tokens based on the number ($T_i$) of existing license tokens at each traffic node, the number ($T_s$) of available tokens at the license server, and/or the traffic capacity ($V_i$) of each traffic node according to a preconfigured redistribution algorithm, wherein the algorithm may be stored in an outside memory device, such as a hardware apart set apart from the moderator, and loaded to the moderator 31 for being processed by the processing unit 312, and the algorithm also can be stored in the memory portion 314 and invoked by the processing unit 312 when needed. In next step of 46, the processing unit 312 commands the first group of traffic nodes, in each of which the suggesting tokens are less than its existing tokens, to release additional tokens ($R_i$, $R_i=T_i-S_i$) to license server 32 and commands the second group of traffic nodes, in each of which the suggesting tokens are more than its existing tokens, to request more tokens ($R_i$, $R_i=S_i-T_i$) from the license server 32 by the input/output unit 312.

When there is no connection 102 between the sever 32 and the moderator 31, and the total number of the license tokens is preconfigured to the moderator 31, then the step of 44 can be skipped. In this case, the processing unit 312 determines the suggesting license tokens for each of traffic nodes 30 by calculating the suggesting number ($S_i$) of license tokens based on the number ($T_i$) of existing license tokens at each traffic node and/or the traffic capacity ($V_i$) of each traffic node according to a preconfigured redistribution algorithm. The redistribution algorithm used to calculate the suggesting number of license tokens can be priority based, demand based and weight based algorithm.

Priority Based:

In this algorithm, each of the traffic nodes 30 has been assigned a priority order and the license tokens are assigned based on the capacity according to the order. For example, assuming that the traffic node TN3 303 has the top priority, the traffic node TN1 301 has the lowest and the traffic node TN2 302 has a middle priority; and the traffic capacity of each traffic node is 500 for TN1, 300 for TN2 and 900 for TN3. Then, in the case that the total number of license tokens is 1000, TN1 301 gets 0, TN2 302 gets 100 and TN3 303 gets 900.

Demand Based:

The license tokens will be redistributed according to the actual demand of traffic capacity. In the case that the license tokens of overall demand is not more than the total license tokens, each of the traffic nodes obtains the license tokens as its demand. However, if the total number of license tokens is less than the license tokens of overall demand, the license tokens is redistributed based on the proportion of the demand for each traffic node separately according to:

$$S_i = \begin{cases} S_{di} & \sum S_{di} \leq Q_{total} \\ Q_{total} \times \frac{S_{di}}{\sum S_{di}} & \sum S_{di} > Q_{total} \end{cases}$$

Wherein $S_{di}$ is the actual demand of license tokens of the $i^{th}$ traffic node, which corresponds to the actual traffic capacity $V_i$, and $Q_{total}$ is the total number of license tokens of the license controlling system.

Weight Based:

Each traffic node is assigned with a weight coefficient ($P_i$) representing an allowed capacity proportion for it. For the traffic nodes where the actual traffic capacity is below the allowed capacity proportion, all unused license tokens is distributed in a percentage of overall demands. Thus, those traffic nodes, which have used up their own allowed capacity proportion and still demand more, obtain the additional license tokens from all unused license tokens. The formula for the weight based distribution is given hereafter:

$$S_i = \begin{cases} S_{di} & S_{di} \leq Q_{total} \times \frac{P_i}{\sum P_i} \text{ or} \\ & \sum S_{di} \leq Q_{total} \\ Q_{total} \times \frac{P_i}{\sum P_i} + \Delta \times \frac{\left(S_{di} - Q_{total} \times \frac{P_i}{\sum P_i}\right)}{\sum \left(\frac{S_{di} - Q_{total} \times \frac{P_i}{\sum P_i}}{}\right)} & S_{di} > Q_{total} \times \frac{P_i}{\sum P_i} \text{ and} \\ & \sum S_{di} > Q_{total} \end{cases}$$

Where $$\Delta = \sum \left(Q_{total} \times \frac{P_i}{\sum P_i} - S_{di}\right)$$

when $$S_{di} < Q_{total} \times \frac{P_i}{\sum P_i} \text{ and } \sum S_{di} > Q_{total}.$$

Note that the distribution algorithm above described examples is only used to illustrate this invention, rather than to limit the invention.

It can be appreciated that the traffic capacity in any algorithm, which is the traffic capacity collected by the moderator processing unit 312 in step of 42, can comprise two parts, one is the actual capacity, and the other is margin capacity which is configured to each traffic node to avoid the traffic node frequently sending a request for redistribution when the traffic capacity of incoming request to the traffic node keeps increasing.

Figure 5:
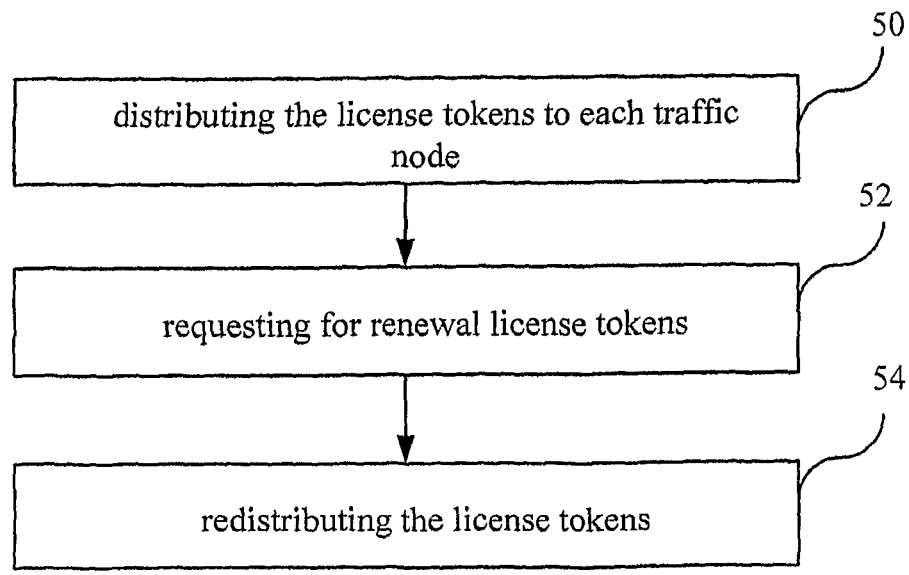
FIG. 5 is a step diagram of a procedure of one example according to the present invention which is applied to the pre-validation operation mode.

FIG. 5 is a step diagram of a procedure of one example according to the present invention which is applied to the pre-validation operation mode. For following description, please also refer to FIGS. 3 and 3A. In the first "initialization" step of 50, the license tokens at license server 32 are distributed according to a pre-configured proportion to each traffic node. In second "renewal" step of 52, the traffic node, whose traffic capacity is about to reach the license tokens obtained during the initialization, sends a request to the license server 32 for renewing license tokens. In further "redistribution" step of 54, the redistribution procedure is executed to redistributing the license tokens among the traffic nodes, after said traffic node fails to renew license tokens from the licenser server 32.

Figure 5A:
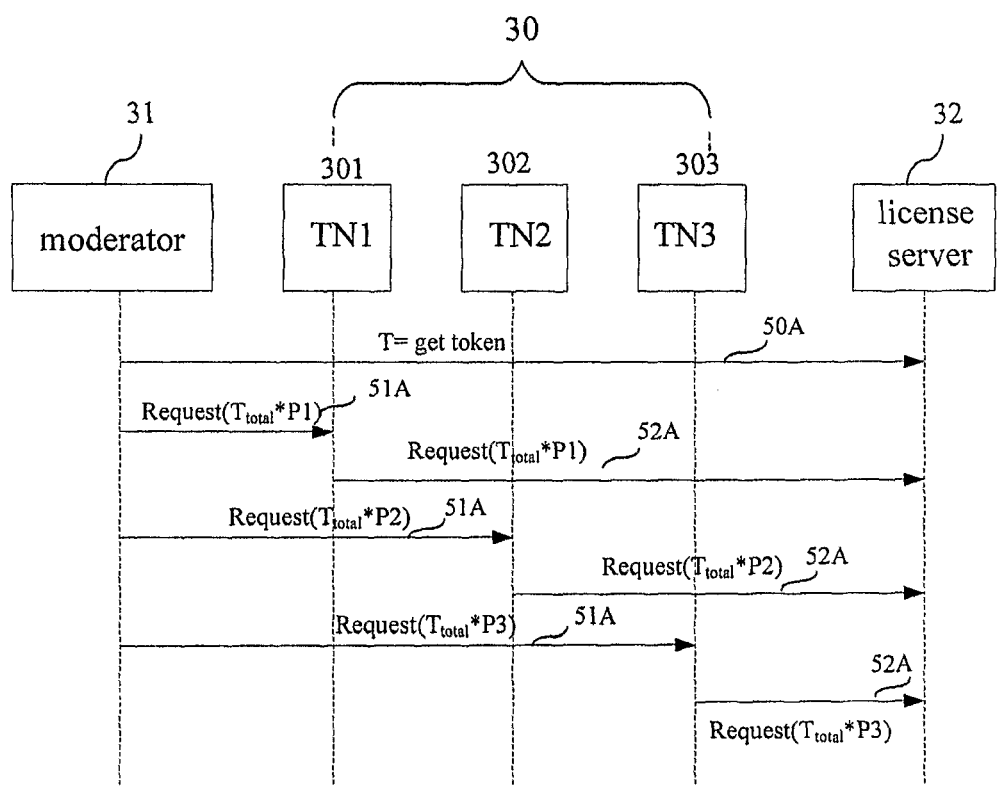
FIG. 5A depicts the step 50 of FIG. 5 in more detail.

FIG. 5A depicts the step of 50 of FIG. 5 in more detail. As shown in FIG. 5A, the processing unit 312 of the moderator 31 sends a command to obtain the total number of license tokens from license sever 32 (step 50A) and receives the feedback information by the input/output unit 310. Then the processing unit 312 determines the number of initial tokens to be preserved, which each traffic node will request from the license server 32, by multiplying the total number of license tokens with a pre-configured proportion for each of traffic nodes 30 (step 51A). For example, the total number of license tokens is 1000, and the proportions for traffic node TN1 301, TN2 302 and TN3 303 are 20%, 30% and 10% respectively, then the numbers of initial tokens for each traffic node are 200 for TN1, 300 for TN2 and 100 for TN3. It should be noted that total proportion of all traffic nodes should less than or equal to 100%, it also can be understood that not all license tokens on the license server 32 have to be distributed to the traffic nodes 30. The moderator 31 then commands each of traffic nodes 30 requests its initial tokens from the license server 32 (step 52A).

Figure 5B:
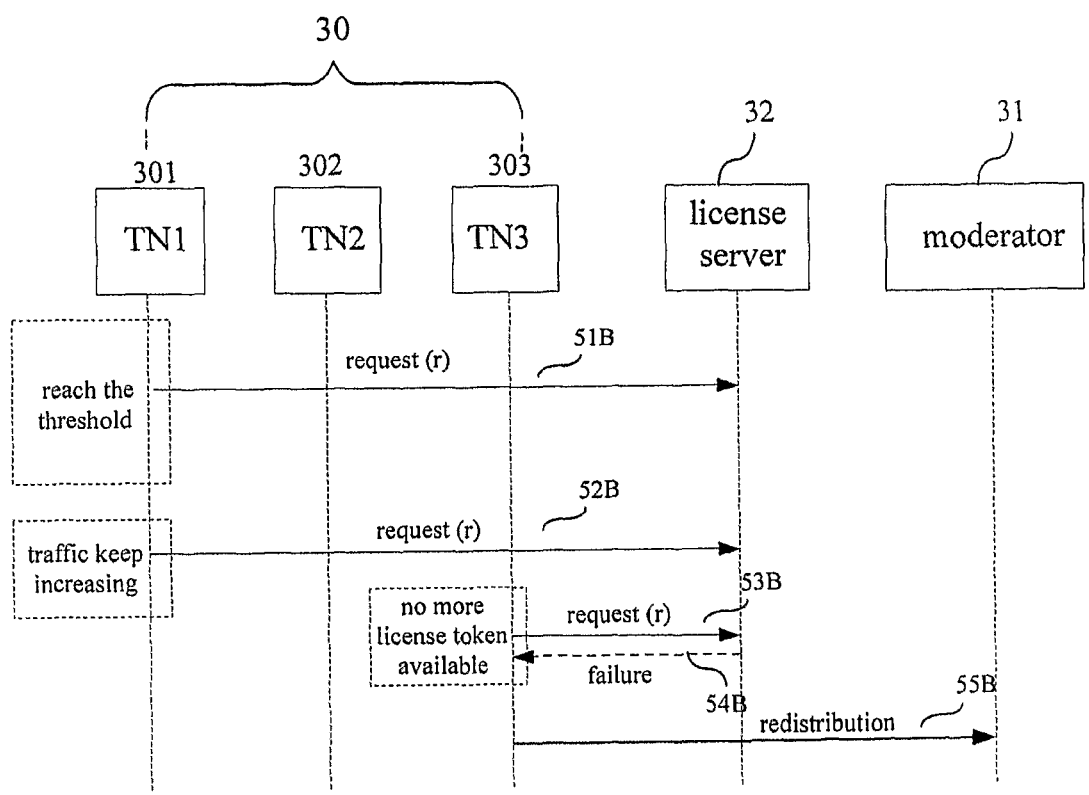
FIG. 5B depicts the step of 52 of FIG. 5 in more detail.

FIG. 5B depicts the step of 52 of FIG. 5 in more detail. Note that a threshold can be pre-configured into each of traffic nodes 30. Once the number of the left over tokens, given by subtracting the number of license tokens corresponding to the capacity being used from the number of existing license tokens (note that the existing license tokens is the initial tokens if the traffic node do not release any license tokens), is equal to the threshold in any traffic node, the traffic node sends a request to the license server 32 for renewal tokens, for example traffic node TN1 301 requests for renewal tokens (step 51B), wherein the renewal tokens can be a configured "step"(s), such as 10 and so on. In the case that the traffic node achieves its renewal tokens, the renewing still can be started upon the threshold is reached again for the traffic capacity of incoming request keeps increasing. As shown in step of 52B, the traffic node TN1 301 requests renewal license tokens from the license server 32 again. In this example, the traffic node 303 also requests for renewal tokens (step 53B), and it fails, as shown in step 54B, since there is no enough license tokens available in the license server 32 to satisfy the request. Thus the traffic node TN3 303 then sends a request (step 55B) for redistribution to the moderator 31. Note that any traffic node, which fails to obtain the license tokens in renewal step, can request for redistribution of the license tokens.

Figure 5C:
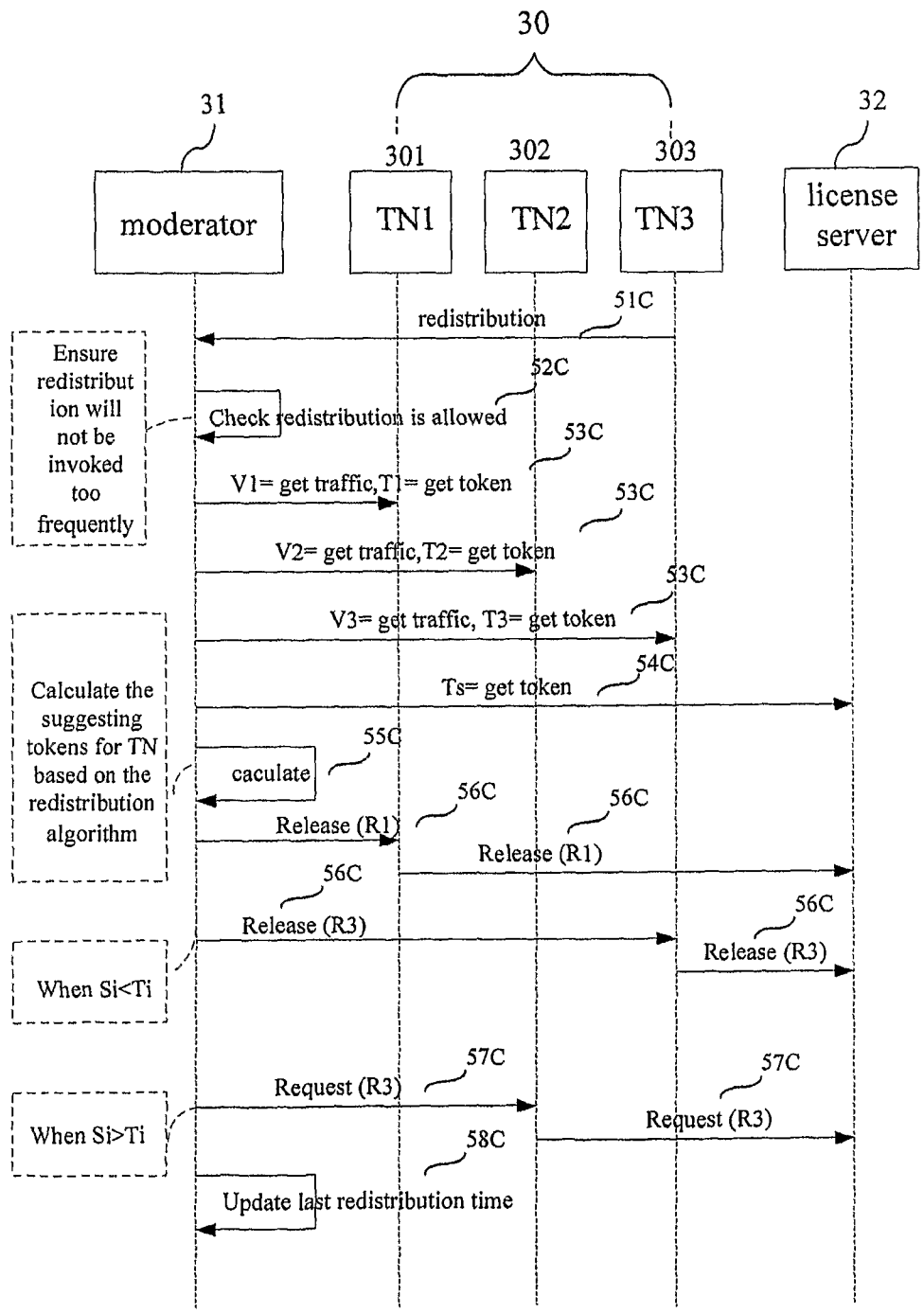
FIG. 5C depicts the step of 53 of FIG. 5 in more detail.

FIG. 5C depicts the step of 54 of FIG. 5 in more detail. The redistribution is triggered when the moderator 31 receives the request for redistribution from traffic nodes 303, as shown in step 51C. Then the processing unit 312 checks whether this redistribution is allowed (step 52C). A scale time is predetermined to avoid the redistribution too frequently especially when the overall traffic capacity exceeds the total license tokens, if the interval between two redistributions in a row is more than or equal to the scale time, the redistribution is allowed, or refused. In this example, the redistribution is allowed. The processing unit 312 further collects the number ($T_i$) of existing license tokens from each of the traffic nodes and the traffic capacity ($V_i$) of each traffic node 30 (step 53C). Then the processing unit 312 obtains the number ($T_s$) of available license tokens from the license server 32 (step 54C). Then the processing unit 312 calculates the suggesting number ($S_i$) of license tokens for each traffic node according to the redistribution algorithm based on Ti, and Ts, and/or $V_i$ (step 55C). After comparing the suggesting number ($S_i$) of license tokens with the existing tokens ($T_i$), the moderator 31 then determines the first group of traffic nodes and the second group of traffic nodes, wherein the first group of traffic nodes consists of the traffic node where the number of existing license tokens are more than the suggesting number of license tokens and the second group of traffic nodes consists of the traffic node where the number of existing license tokens are less than the suggesting number of license tokens. The processing unit 312 then commands each of the first group of traffic nodes releases the additional license tokens Ri ($R_i=T_i-S_i$) to the licenser server 32 (step 56C), for example, commands the traffic node TN1 301 and traffic node TN3 303 to release their additional license tokens respectively. The processing unit 312 also commands the second group of traffic nodes, only TN2 in this example, to request more license tokens Ri ($R_i=S_i-T_i$) from the license server 32 (step 57C). Finally, the moderator 31 updates the last redistribution time (step 58C).

In the case that all license tokens at the license server 32 are distributed to the traffic nodes 30 in initialization step, the renewal step can be skipped.

Figure 6:
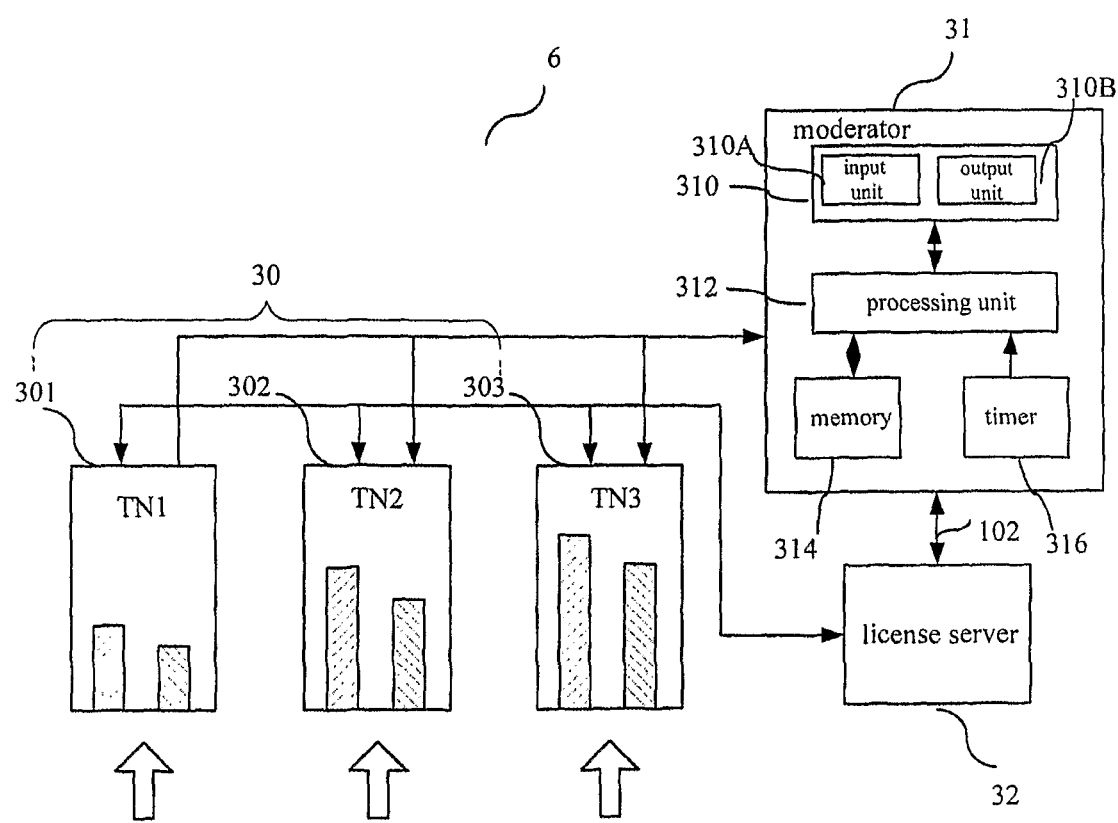
FIG. 6 is a block diagram showing the license controlling system according to another example of the present invention.

FIG. 6 is a block diagram showing the license controlling system 6 according to another example of the present invention. Regarding FIG. 6, by using identical reference numerals to denote components identical to the example shown in FIGS. 3 and 3A, their description is omitted. In comparison with FIGS. 3 and 3A, the moderator 31 in this example further includes a settable timer 316 for setting a redistribution time. A triggering information is sent to the processing unit 312 upon the redistribution time arrives, that is, the processing unit 312 receives the triggering information from the settable timer when the redistribution time arrives. And the timer 316 updates the redistribution time for next redistribution based on a pre-configured timing algorithm. Comparing with the procedure which is shown in FIG. 4, the redistribution procedure executed in this license controlling system is executed not depending on the requesting from the traffic node, but on the arriving of redistribution time of the settable timer 316.

With reference to FIG. 6, a redistribution time is set by the settable timer 316. Once the redistributing time arrives, the redistribution is started. Then the processing unit 312 collects the usage information of each of the traffic nodes 30 wherein the usage information includes the traffic capacity ($V_i$) of each traffic node and the number ($T_i$) of existing license tokens at each of the traffic nodes 30. The moderator 31 may collect the number ($T_s$) of available license tokens at the license server 32 (if the connection 102 between the process unit and the license server is established). After receiving the usage information and the available license tokens, the process unit 312 calculates the suggesting number of license tokens for each of traffic nodes 30 according to a preconfigured redistributing algorithm based on the usage information $V_i$ and $T_i$ and the total license tokens ($\Sigma T_i+T_s$), or based on part of the usage information like Ti and the total license tokens. Then the moderator 31 commands the first group of traffic nodes, which consists of the traffic node where the suggesting tokens are less than the existing tokens, to release additional tokens $R_i$ ($R_i=T_i-S_i$) to license server 32 and commands the second group of traffic nodes, which consists of the traffic node where the suggesting tokens are more than the existing tokens, to request more tokens $R_i$ ($R_i=S_i-T_i$) from the license server 32. Then the settable timer 316 sets time for the next redistribution.

Figure 7:
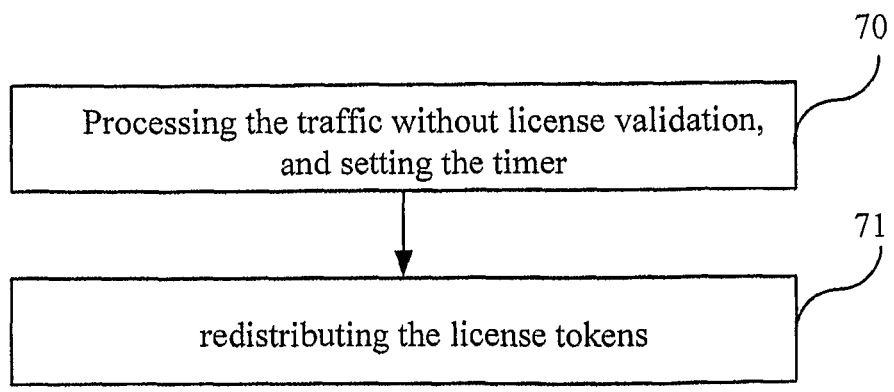
FIG. 7 is a step diagram of a procedure used in a post-validation mode according to the present invention.

FIG. 7 is a step diagram of a procedure used in a post-validation mode according to the present invention. In the first "initialization" step 70, each of the traffic nodes 30 receives and processes the traffic of incoming request without the license validation from the license server, and the redistribution time in the settable timer 316 for the first redistribution is set as $t_1$. In the next "redistribution" step 71, the redistribution procedure is implemented when the processing unit 312 receives triggering information from the settable timer 316. It is noted that the license tokens for each of the traffic nodes 30 are deducted from the licenser server 32 before the redistribution step according to the actual capacity usage at a time, wherein the actual capacity usage can be collected by the moderator 31. How the license is performed and the license tokens are deducted is not the scope of the claimed invention and, thus, the procedure will not be described any further in this document.

Figure 7B:
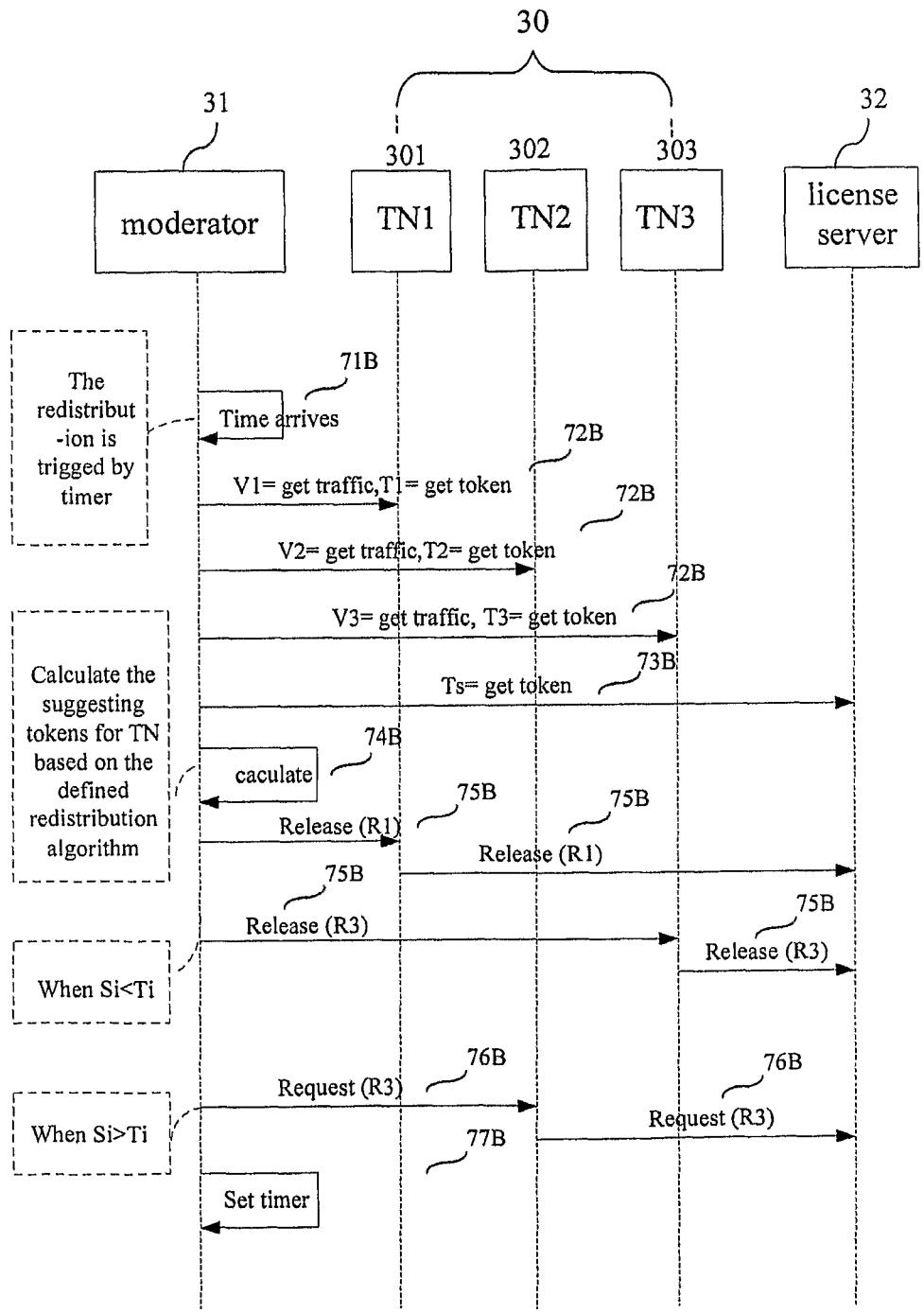
FIG. 7B depicts more details of the step 71.

Refer to FIG. 7B for more details of the step 71. The redistribution is started when the redistribution time of the settable timer arrives (step 71B). The processing unit 312 further collects the number ($T_i$) of existing license tokens from each of the traffic nodes 30, and collects the traffic capacity ($V_i$) of each traffic node (step 72B). Then the processing unit 312 obtains the number ($T_s$) of available license tokens at the license server 32 (step 73B). Then the processing unit 312 further calculates a suggesting number ($S_i$) of the license tokens for each traffic node according to the redistribution algorithm based on $T_i$, and $T_s$, and/or $V_i$ (step 74B).

Further, the processing unit 312 determines the first group of traffic nodes, in each of which the number of existing license tokens of each traffic node is more than the suggesting number of license tokens and the second group of traffic nodes, in each of which the number of existing license tokens of each traffic node is less than the suggesting number of license tokens, by comparing the suggesting number of license tokens with the existing number of license tokens. The processing unit 312 then commands each of the first group of traffic nodes 30 releases the additional license tokens $R_i$ ($R_i=T_i-S_i$) to the license servers 32 (step 75B), for example, commands the traffic node TN1 301 to release R1 license tokens and the traffic node TN3 303 to release R3 license tokens. The processing unit 312 also commands each of the second group of traffic nodes 30, for example TN2 302, to request more license tokens $R_i$ ($R_i=S_i-T_i$) from the license server 32 (step 76B). Finally the settable timer 316 updates its time of the settable timer 316 for next redistribution (step 77B) according to a pre-configured time algorithm.

In brief, the pre-configured time algorithm is based on the total traffic capacity collected, the bigger the traffic is, the smaller the time step is. In the case of a minimal time interval and maximal time interval set in advance, the timing algorithm for the next redistribution time $t^k$ is shown:

$$t_k = t_{k-1} + \Delta t_k;$$

$$\Delta t_k = \Delta t_{min} + f(V_{k-1})(\Delta t_{max} - \Delta t_{min});$$

$$f(V_{k-1}) = \begin{cases} 1 & V_{k-1} = 0, \\ \dfrac{\lambda}{V_{k-1}} & V_{max} > V_{k-1} > 0, 0 < \lambda < 1; \\ 0 & V_{max} < V_{k-1} \end{cases}$$

Where the total traffic capacity of all the traffic nodes $V_{k-1}$ is modulated to numeric: 0,1,2 , . . . .

$V_{max}$ is the total allowed traffic capacity in the license controlling system;

K={0, 1, 2, . . . } and $\lambda$, $\Delta t_{min}$, $\Delta t_{max}$ and $V_{max}$ are settable.

The algorithm above mentioned is only an example for illustrating the invention, and it should not be used to limit the claimed invention. It could be appreciated that the redistributing procedure which is shown in FIG. 7 can also be used in pre-validation mode with a little modification, for example, setting a settable timer to the controlling system 3 and thus the redistribution procedure is started by receiving triggering information from the timer instead of request from traffic nodes.

The redistributing procedure shown in FIG. 5C can also be used in post-validation mode, e.g. after the first redistribution is triggered by the time arriving of the settable timer, the next redistribution can be triggered by request from the traffic nodes.

In addition, as an alternative, the calculating step of 55C and 77B can be executed by the respective traffic node. In this case, each traffic node calculates the suggesting number of license tokens according to the algorithm (which can be pre-configured in each traffic node in advance) based on its own existing number of license tokens and its own traffic capacity, and then send the result of this calculating to the moderator. As the moderator under this situation, it determines the first and second groups of traffic nodes by only comparing the number of existing license tokens and the suggesting number of tokens. Moreover, in this case, the moderator has not to collect the traffic capacity of each traffic node.

Although the exemplary embodiments have been described above, the present invention is not limited to these exemplary embodiments. The exemplary embodiments may be used in combination or each of the embodiments may be partially modified, with the spirit and scope the present invention.

While the preferred exemplary embodiments of the present invention have been described using specific items, such description is for illustrative purpose only, and it is to be understood that changes and variations may be made without departing from the spirit and scope the following claims.

The invention claimed is:

1. A method for redistributing license tokens to a plurality of traffic nodes in a license controlling system, the method comprising:
    receiving, by a moderator, a request for redistribution from any of the traffic nodes;
    checking, by the moderator, whether the redistribution request is allowed by comparing interval between the request and a last request with a predetermined period of time, when the interval is more than or equal to the predetermined period of time, determining that the redistribution request is allowed; and
    triggering, by the moderator, the redistribution when it is determined that the redistribution request is allowed,
    wherein the step of triggering the request comprises:
        collecting, by the moderator, usage information of each of the traffic nodes;
        updating, by the moderator, a last redistributing time;
        determining, by the moderator, a set of license tokens representing suggested license tokens for each of the traffic nodes;
        commanding, by the moderator, a first group of traffic node(s) to release license tokens back to a license server of the license controlling system based on the usage information and the set of license tokens; and
        commanding, by the moderator, a second group of traffic node(s) to request more license tokens from the license server based on the usage information and the set of license tokens, and
    wherein the redistribution is triggered only when it is determined that the redistribution request is allowed.

2. The method of claim 1, wherein the usage information for each traffic node includes one or both of a traffic capacity of that traffic node, and a number of existing license tokens at that traffic node.

3. The method of claim 2, wherein the step of determining the set of license tokens for each traffic node comprises calculating a total number of license tokens in the set of license tokens for that traffic node based on the traffic capacity and the number of existing license tokens at that traffic node.

4. The method of claim 3, wherein a redistribution algorithm used in the method is preconfigured and the redistribution algorithm is a priority based, demand based or weight based distribution algorithm.

5. The method of claim 3,
    wherein for each traffic node in the first group of traffic node(s), the number of the existing license tokens at that traffic node is more than the total number of tokens in the set of license tokens calculated for that traffic node, and
    wherein for each traffic node in the second group of traffic node(s), the number of the existing license tokens at that traffic node is less than the total number of tokens in the set of license tokens calculated for that traffic node.

6. The method of claim 2, further comprising:
    collecting, by the moderator, a number of available license tokens at the license server, wherein the step of determining the set of license tokens for each traffic node comprises calculating a total number of tokens in the set of license tokens for that traffic node based on the traffic capacity of that traffic node, the number of existing license tokens at that traffic node and the collected number of available license tokens at the license server.

7. The method of claim 1, wherein the redistributing is triggered by receiving triggering information from a settable timer.

8. The method of claim 7, further comprising setting a settable timer after the step of commanding according to a timing algorithm.

9. A moderator used in a license controlling system, the moderator comprising:
   an input unit adapted to receive information from a plurality of traffic nodes and/or a license server of the license controlling system;
   an output unit adapted to send information to the plurality of traffic node and/or the license server;
   a processing unit adapted to collect usage information of each of the traffic nodes by the input unit and determine a set of license tokens representing suggested license tokens for each of the traffic nodes; and
   a memory portion adapted to store the usage information and the set of license tokens for each of the traffic nodes,
   wherein the processing unit is further adapted to
      receive a request for redistribution from any of the traffic node by the input unit,
      check whether the request for redistribution is allowed by comparing an interval between the request and a last request with a predetermined period of time, when the interval is more than or equal to the predetermined period of time, determine that the request for redistribution is allowed, and
      trigger the redistribution when it is determined that the request for redistribution is allowed,
   wherein when the redistribution is triggered, the processing unit is adapted to
      collect the usage information after the redistribution is received,
      update a last redistributing time,
      command, via the output unit, a first group of traffic node(s) to release license tokens back to the license server based on the usage information and the set of license tokens, and
      command, via the output unit, a second group of traffic node(s) to request more license tokens from the license server based on the usage information and the set of license tokens, and
   wherein the redistribution is triggered only when it is determined that the request for redistribution is allowed.

10. The moderator of claim 9, wherein the usage information collected for each traffic node includes one or both of a traffic capacity of that traffic node, and a number of existing license tokens at that traffic node.

11. The moderator of claim 10, wherein the processing unit is adapted to determine the set of license tokens for each traffic node by calculating a total number of license tokens in the set of license tokens for that traffic node based on the traffic capacity and the number of existing license tokens at that traffic node.

12. The moderator of claim 11, a redistributing algorithm used by the processing unit is preconfigured and the redistributing algorithm is a priority based, demand based or weight based distribution algorithm.

13. The moderator of claim 11,
   wherein for each traffic node in the first group of traffic node(s), the number of the existing license tokens at that traffic node is more than the total number of tokens in the set of license tokens calculated for that traffic node, and
   wherein for each traffic node in the second group of traffic node(s), the number of the existing license tokens at that traffic node is less than the total number of tokens in the set of license tokens calculated for that traffic node.

14. The moderator of claim 10, wherein the processing unit further adapted to
   collect a number of available license tokens at the license server, and
   determine the set of license tokens for each traffic node by calculating the total number of tokens in the set of license tokens for that traffic node based on the traffic capacity of that traffic node, the number of existing license tokens at that traffic node, and the available license tokens at the license server.

15. The moderator of claim 9, further comprising a settable timer for setting a redistributing time,
   wherein the processing unit is adapted to receive triggering information from the settable timer.

16. The moderator of claim 15, wherein the settable timer is adapted to update the redistribution time for next redistributing.

17. A license controlling system, comprising:
   traffic nodes adapted to handle incoming traffic from telecom network, and to provide services to terminals requesting services via the network;
   a license server adapted to send license tokens to the traffic nodes and to receive the license tokens released by any of the traffic nodes; and
   a moderator of claim 9.

18. A license server for a license controlling system, which is integrated with a moderator of claim 9.

19. A license controlling system including a plurality of traffic nodes and a license server of claim 18.

20. A computer program, stored on a non-transitory storage medium, for redistributing license tokens to a plurality of traffic nodes in a license controlling system, the program comprising executable instructions that cause a computer of a moderator to:
   receive a request for redistribution from any of the traffic nodes;
   check whether the redistribution request is allowed by comparing an interval between the request and a last request with a predetermined period of time, when the interval is more than or equal to the predetermined period of time, determine that the redistribution request is allowed; and
   trigger the redistribution when it is determined that the redistribution request is allowed,
   wherein when the redistribution is triggered, the executable instructions cause the computer of the moderator to
      collect usage information of each of the traffic nodes;
      update a last redistributing time;
      determine a set of license tokens representing suggested license tokens for each of the traffic nodes;
      command a first group of traffic node(s) to release license tokens back to a license server of the license controlling system based on the usage information and the set of license tokens; and
      command a second group of traffic node(s) to request more license tokens from the license server based on the usage information and the set of license tokens, and wherein the redistribution is triggered only when it is determined that the redistribution request is allowed.

21. A redistribution method performed by a moderator of a license controlling system to redistribute licensed capacity for a licensed service among a plurality of traffic nodes adapted to provide services to terminals of a network, the redistribution method comprising:
communicating, by the moderator, with the plurality of traffic nodes so as to collect usage information related to the licensed service;
determining, by the moderator, a suggested licensed capacity for each traffic node based on the usage information;
determining, by the moderator, a first group of traffic node(s) based on the usage information such that for each traffic node in the first group, an existing licensed capacity is greater than the suggested licensed capacity;
determining, by the moderator, a second group of traffic node(s) based on the usage information such that for each traffic node in the second group, an existing licensed capacity is less than the suggested licensed capacity;
instructing, by the moderator, each traffic node of the first group to communicate with a license server of the license controlling system so as to release a portion of its existing licensed capacity back to the license server;
instructing, by the moderator, each traffic node of the second group to communicate with the license server so as to request more licensed capacity from the license server; and
determining, by the moderator, a total licensed capacity for the licensed service,
wherein the license server is adapted to control a distribution of the licensed capacity of the licensed service among the plurality of traffic nodes, and
wherein the step of determining the suggested licensed capacity comprises determining the suggested licensed capacity for each traffic node based on the usage information and the total licensed capacity.

22. The redistribution method of claim 21,
wherein the usage information of each traffic node comprises Ti and Vi, Ti representing a number of existing license tokens at that traffic node, and Vi representing a traffic capacity of that traffic node,
wherein the step of determining the suggested licensed capacity for each traffic node based on the usage information comprises determining a suggested Si for each traffic node based on the usage information, Si representing a suggested number of license tokens for that traffic node,
wherein Ti >Si is satisfied for each traffic node in the first group, and Ti <Si is satisfied for each traffic node in the second group,
wherein the step of instructing each traffic node of the first group comprises instructing each traffic node of the first group to communicate with the license server so as to release one or more of its existing license tokens Ti back to the license server, and
wherein the step of instructing each traffic node of the second group comprises instructing each traffic node of the second group to communicate with the license server so as to request more license tokens Ti from the license server.

23. The redistribution method of claim 21,
wherein the usage information of each traffic node comprises Ti and Vi, Ti representing a number of existing license tokens at that traffic node, and Vi representing a traffic capacity of that traffic node,
wherein the step of determining the total licensed capacity comprises determining Ts representing a total number of licensed tokens for the licensed service,
wherein the step of determining the suggested licensed capacity for each traffic node based on the usage information comprises determining a suggested Si for each traffic node based on the usage information and Ts, Si representing a suggested number of license tokens for that traffic node,
wherein Ti >Si is satisfied for each traffic node in the first group, and Ti <Si is satisfied for each traffic node in the second group,
wherein the step of instructing each traffic node of the first group comprises instructing each traffic node of the first group to communicate with the license server so as to release one or more of its existing license tokens Ti back to the license server, and
wherein the step of instructing each traffic node of the second group comprises instructing each traffic node of the second group to communicate with the license server so as to request more license tokens Ti from the license server.

24. The redistribution method of claim 21, wherein the moderator is separate from the license server.

25. The redistribution method of claim 21, wherein the moderator is separate from the plurality of traffic nodes.

26. A moderator of a license controlling system, the moderator adapted to redistribute licensed capacity for a licensed service among a plurality of traffic nodes adapted to provide services to terminals of a network, the moderator comprising:
an input/output unit adapted to communicate with the plurality of traffic nodes; and
a processing unit adapted to
collect, via the input/output unit, collect usage information related to the licensed service from the plurality of traffic nodes,
determine a suggested licensed capacity for each traffic node based on the usage information,
determine a first group of traffic node(s) based on the usage information such that for each traffic node in the first group, an existing licensed capacity is greater than the suggested licensed capacity,
determine a second group of traffic node(s) based on the usage information such that for each traffic node in the second group, an existing licensed capacity is less than the suggested licensed capacity,
instruct, via the input/output unit, each traffic node of the first group to communicate with a license server of the license controlling system so as to release a portion of its existing licensed capacity back to the license server,
instruct, via the input/output unit, each traffic node of the second group to communicate with the license server so as to request more licensed capacity from the license server, and
determine a total licensed capacity for the licensed service,
wherein the license server is adapted to control a distribution of the licensed capacity of the licensed service among the plurality of traffic nodes, and
wherein the processing unit is adapted to determine the suggested licensed capacity for each traffic node based on the usage information comprises and the total licensed capacity.

27. The moderator of claim 26,
wherein the usage information of each traffic node comprises Ti and Vi, Ti representing a number of existing license tokens at that traffic node, and Vi representing a traffic capacity of that traffic node, wherein the processing unit is adapted determine a suggested Si for each traffic node as the suggested licensed capacity of that traffic node, Si representing a suggested number of license tokens for that traffic node and being determined based on the usage information, wherein Ti >Si is satisfied for each traffic node in the first group, and Ti <Si is satisfied for each traffic node in the second group, wherein the processing unit is adapted to instruct the first group by instructing, via the input/output unit, each traffic node of the first group to communicate with the license server so as to release one or more of its existing license tokens Ti back to the license server, and wherein the processing unit is adapted to instruct the second group by instructing, via the input/output unit, each traffic node of the second group to communicate with the license server so as to request more license tokens Ti from the license server.

28. The moderator of claim 26, wherein the usage information of each traffic node comprises Ti and Vi, Ti representing a number of existing license tokens at that traffic node, and Vi representing a traffic capacity of that traffic node, wherein the processing unit is adapted to determine Ts as the total licensed capacity, Ts representing a total number of licensed tokens for the licensed service, wherein the processing unit is adapted determine a suggested Si for each traffic node as the suggested licensed capacity of that traffic node, Si representing a suggested number of license tokens for that traffic node and being determined based on the usage information and Ts, wherein Ti >Si is satisfied for each traffic node in the first group, and Ti <Si is satisfied for each traffic node in the second group, wherein the processing unit is adapted to instruct the first group by instructing, via the input/output unit, each traffic node of the first group to communicate with the license server so as to release one or more of its existing license tokens Ti back to the license server, and wherein the processing unit is adapted to instruct the second group by instructing, via the input/output unit, each traffic node of the second group to communicate with the license server so as to request more license tokens Ti from the license server.

29. The moderator of claim 26, wherein the moderator is separate from the license server.

30. The moderator of claim 26, wherein the moderator is separate from the plurality of traffic nodes.

* * * * *